(12) United States Patent
Self et al.

(10) Patent No.: US 10,002,400 B2
(45) Date of Patent: Jun. 19, 2018

(54) METHOD AND APPARATUS FOR DYNAMIC GENERATION OF VECTOR GRAPHICS

(71) Applicant: Change Healthcare Holdings, LLC, Nashville, TN (US)

(72) Inventors: Bryan Self, Birmingham, AL (US); Joshua Turner, Hueytown, AL (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 58 days.

(21) Appl. No.: 15/084,824

(22) Filed: Mar. 30, 2016

(65) Prior Publication Data

US 2017/0287099 A1  Oct. 5, 2017

(51) Int. Cl.
*G06T 1/20* (2006.01)
*G06T 15/00* (2011.01)
*G06T 1/00* (2006.01)

(52) U.S. Cl.
CPC ............... *G06T 1/20* (2013.01); *G06T 1/00* (2013.01); *G06T 15/00* (2013.01)

(58) Field of Classification Search
None
See application file for complete search history.

(56) References Cited

U.S. PATENT DOCUMENTS

| 2003/0098862 | A1* | 5/2003 | Hunt | G06T 17/00 345/418 |
| 2005/0193368 | A1* | 9/2005 | Becker | G06F 9/4443 717/106 |
| 2006/0132480 | A1* | 6/2006 | Muller | G06F 11/3668 345/418 |
| 2009/0273604 | A1* | 11/2009 | Kim | G06T 1/20 345/522 |
| 2010/0309195 | A1* | 12/2010 | Castleman | G06F 3/0481 345/418 |
| 2011/0018884 | A1* | 1/2011 | Ritts | G06F 11/32 345/522 |

\* cited by examiner

*Primary Examiner* — Martin Mushambo
(74) *Attorney, Agent, or Firm* — Alston & Bird LLP

(57) ABSTRACT

A method, apparatus and computer program product provide mechanisms for generating vector graphics. The method includes receiving input defining a plurality of graphic elements, determining a plurality of graphic element definitions, each graphic element definition corresponding to at least one of the plurality of graphic elements, generating a graphic definition object comprising each of the graphic element definitions, providing the graphic definition object to a vector graphic renderer, and receiving, from the vector graphic renderer, a vector graphic comprising each of the plurality of graphic elements.

20 Claims, 6 Drawing Sheets

METHOD AND APPARATUS FOR DYNAMIC GENERATION OF VECTOR GRAPHICS

TECHNOLOGICAL FIELD

Example embodiments of the present invention relate generally to methods, systems, and computer readable storage media for generating graphics and, more particularly, to methods, systems, and computer readable media for dynamically generating vector graphics.

BACKGROUND

Computer graphics are frequently defined using sets of samples placed within locations of a defined space. The act of mapping these samples to locations within a set of coordinates is known as rasterizing the graphic. Such rasterization processes are frequently performed in the context of mapping the components of an image to pixels of a display. While storing images in a raster format may provide certain benefits, such as ease of compression and efficient display, storing images in such a format also introduces certain drawbacks. For example, altering the display size of a raster image from the size in which it is originally designed to be presented often causes a severe reduction in visual fidelity.

To address these problems and other problems with raster images, vector graphic formats have been developed, such as the Scalable Vector Graphics (SVG) standard. Such formats store images as a series of instructions for drawing the image, rather than a map of image elements to a particular known reference frame. For example, a vector graphics format may express an image as a set of vectors, relative node locations, line widths, colors, curve shapes, thicknesses, and/or fills. These formats offer the advantage of constant visual fidelity at all sizes. However, the act of displaying such images requires the use of a virtual canvas implemented by a software process that takes the series of instructions and "draws" the image by following the instructions. Each such image requires a separate virtual canvas, and executing the necessary processes to provide such a canvas may require substantial system resources. While present systems that utilize vector graphics may be able to display a small number of such graphics using a small number of canvases, the system resources required to implement interfaces that include large numbers of simultaneously displayed vector graphics, each with their own attendant canvas, make the use of vector graphics in such interfaces impractical. Through applied effort, ingenuity, and innovation, the inventors have solved many of these identified problems by developing a technical solution that is embodied by the present invention, which is described in detail below.

BRIEF SUMMARY

Methods, apparatuses and computer program products are therefore provided according to example embodiments of the present invention for dynamically generating vector graphic images. Embodiments include interfaces and/or applications for generating a set of graphic definition objects for defining a particular vector graphic. The graphic definition objects are provided to a rendering element, which in turn generates a vector graphic from the graphic definition object. Generation of the vector graphic may include identifying executable code portions associated with the graphic elements defined within the graphic definition object, and executing that identified executable code to construct portions of the vector graphic. Embodiments may also access a set of content data accessed by a rendering element to further determine content of the vector graphic. The rendering element may update the vector graphic to provide for a dynamic vector graphic that responds to changes in the associated graphic definition object.

An example of an embodiment includes a method for generating a vector graphic. The method includes receiving input defining a plurality of graphic elements, determining a plurality of graphic element definitions, each graphic element definition corresponding to at least one of the plurality of graphic elements, generating a graphic definition object comprising each of the graphic element definitions, providing the graphic definition object to a vector graphic renderer, and receiving, from the vector graphic renderer, a vector graphic comprising each of the plurality of graphic elements.

The method may include causing display of the vector graphic via a display device. The vector graphic may be displayed via a single vector graphic canvas. The method may also include rendering the graphic definition by the vector graphic object by at least determining at least one set of executable code associated with each of the plurality of graphic elements, and executing the at least one set of executable code to determine at least a portion of the vector graphic. The at least one set of executable code may be determined based at least in part on a type of graphic element indicated by at least one of the graphic element definitions. The graphic definition object may be a Java object. The vector graphic may be formatted according to the Scalable Vector Graphic standard. The graphic element may include at least one sub-element. At least one of the graphic element definitions may define at least one query to be executed against a content datastore, and the method may include executing the at least one query against the content datastore, and including a result of the at least one query in the graphic definition object.

Another example of an embodiment includes an apparatus for generating a vector graphic comprising a processor and a memory. The memory stores instructions that configure the processor to at least receive input defining a plurality of graphic elements, determine a plurality of graphic element definitions, each graphic element definition corresponding to at least one of the plurality of graphic elements, generate a graphic definition object comprising each of the graphic element definitions, provide the graphic definition object to a vector graphic renderer, and receive, from the vector graphic renderer, a vector graphic comprising each of the plurality of graphic elements.

The apparatus may be further configured to cause display of the vector graphic via a display device. The vector graphic may be displayed via a single vector graphic canvas. The apparatus may be further configured to render the graphic definition by the vector graphic object by at least determining at least one set of executable code associated with each of the plurality of graphic elements, and executing the at least one set of executable code to determine at least a portion of the vector graphic. The at least one set of executable code may be determined based at least in part on a type of graphic element indicated by at least one of the graphic element definitions. The graphic definition object may be a Java object. The vector graphic may be formatted according to the Scalable Vector Graphic standard. The graphic element may include at least one sub-element. At least one of the graphic element definitions may define at least one query to be executed against a content datastore, and the method may further include executing the at least one query against the content datastore, and including a result of the at least one query in the graphic definition object.

Another example of an embodiment includes a non-transitory computer readable storage medium comprising instructions for generating a vector graphic that, when executed by a processor, configure the processor to at least receive input defining a plurality of graphic elements, determine a plurality of graphic element definitions, each graphic element definition corresponding to at least one of the plurality of graphic elements, generate a graphic definition object comprising each of the graphic element definitions, provide the graphic definition object to a vector graphic renderer, and receive, from the vector graphic renderer, a vector graphic comprising each of the plurality of graphic elements. The computer readable storage medium may also include instructions configured to cause display of the vector graphic via a display device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
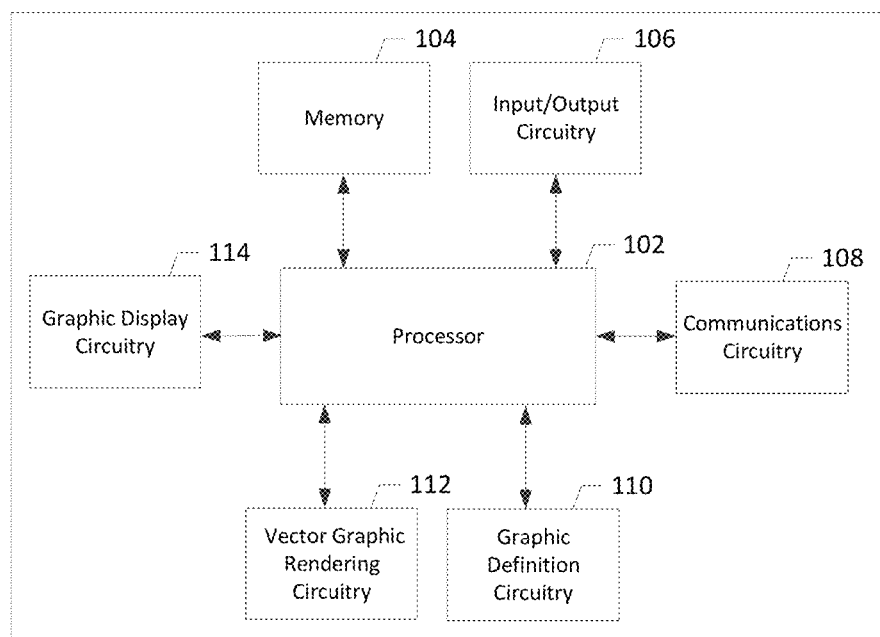
Figure 2:
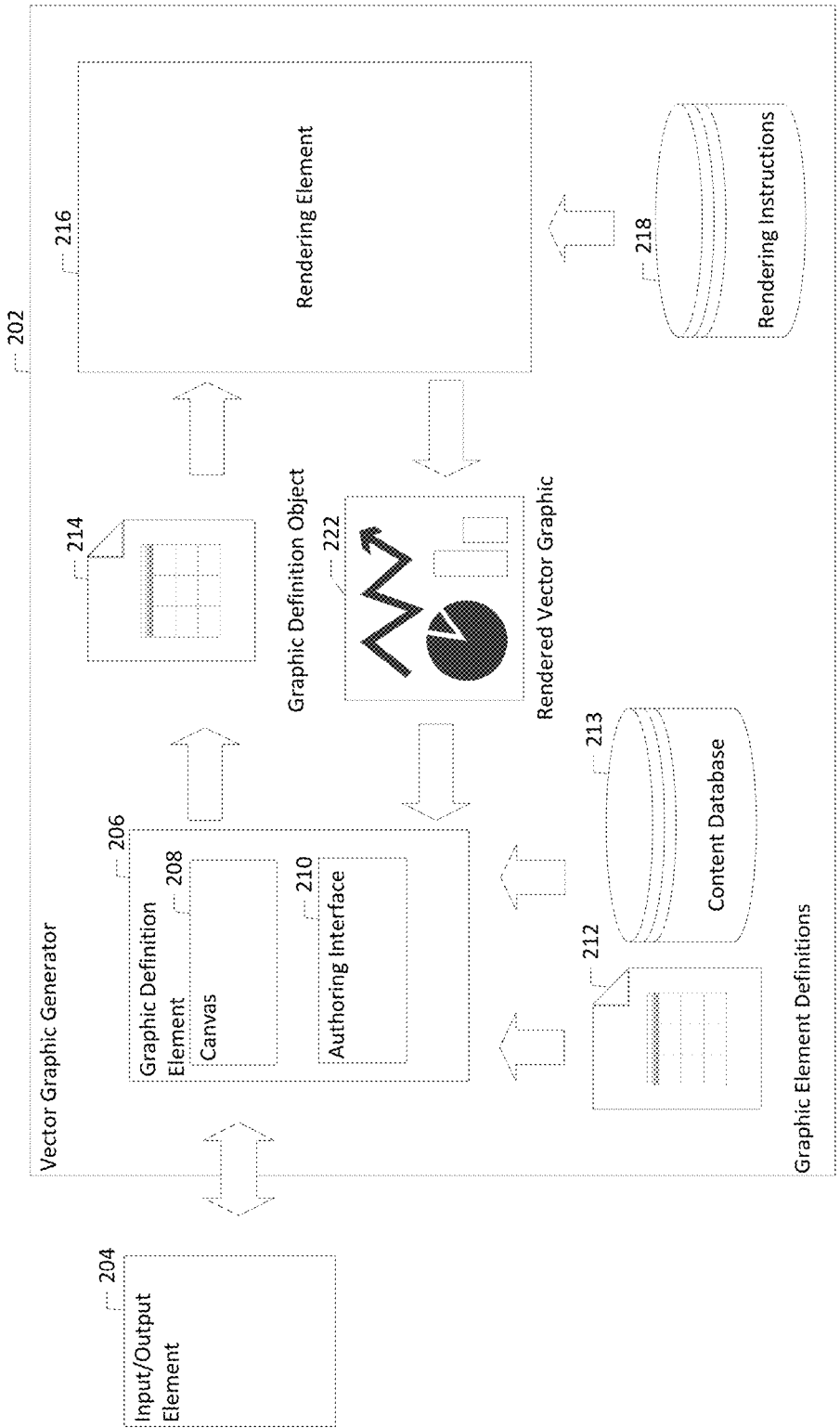
Figure 3:
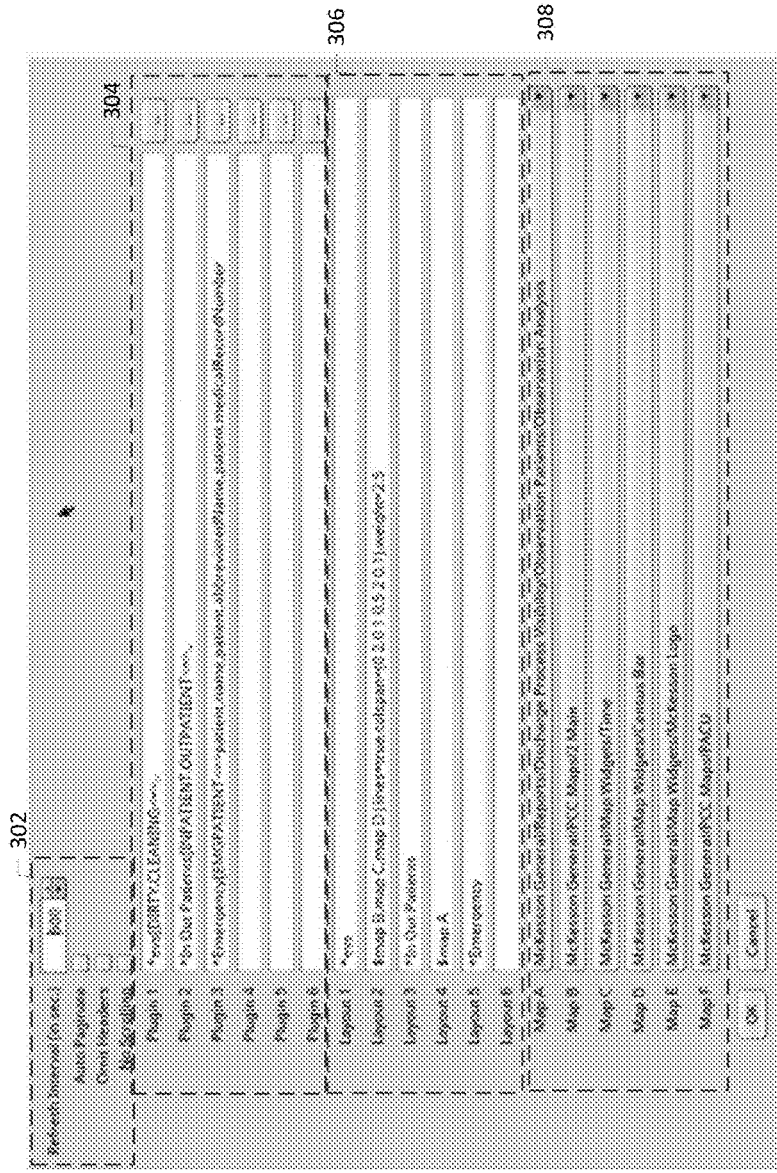
Figure 4:
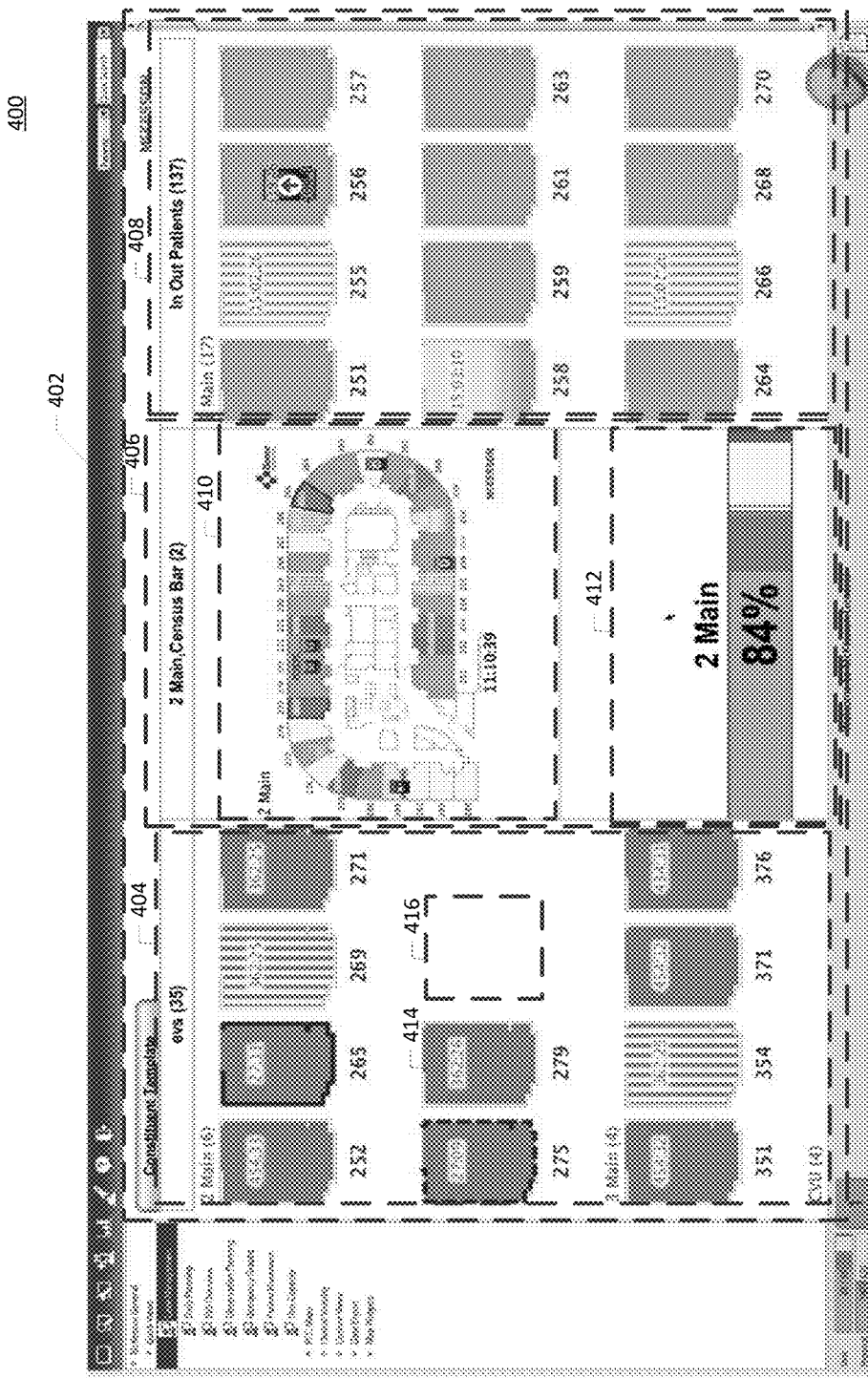
Figure 5:
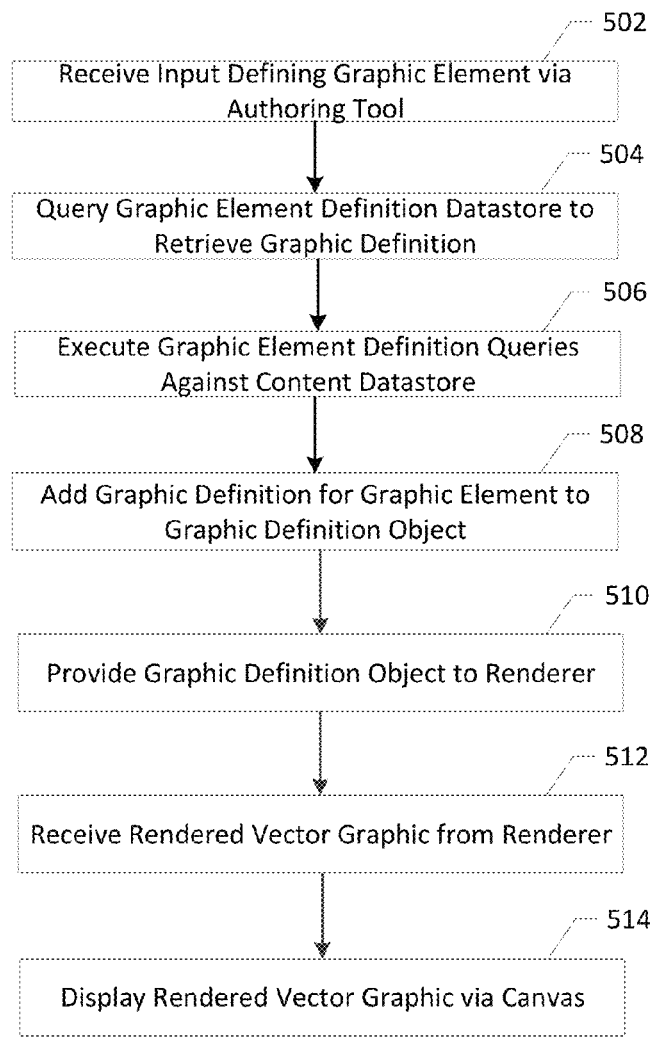
Figure 6:
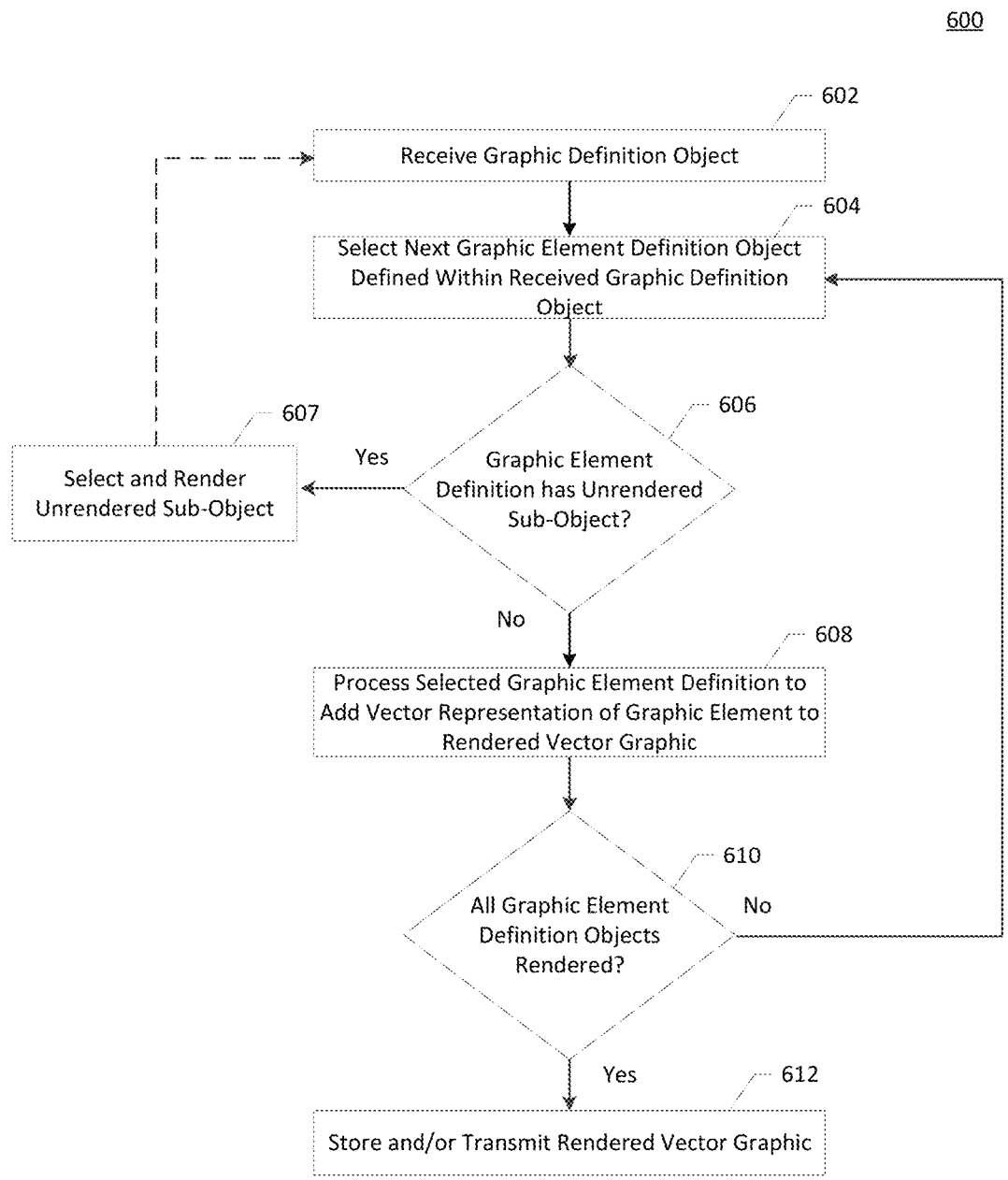

Having thus described certain embodiments of the invention in general terms, reference will now be made to the accompanying drawings, which are not necessarily drawn to scale, and wherein:

FIG. 1 is a block diagram of an apparatus for generating vector graphics in accordance with some embodiments of the present invention;

FIG. 2 depicts a data flow among elements of a vector graphic generation system in accordance with some embodiments of the present invention;

FIGS. 3 and 4 depict examples of interfaces for authoring and/or displaying vector graphics in accordance with some embodiments of the present invention;

FIG. 5 depicts an illustration of a flow diagram illustrating an example of an algorithm for generating a graphic definition object and receiving a vector graphic in accordance with some embodiments of the present invention; and FIG. 6 depicts an illustration of a flow diagram illustrating an example of an algorithm for generating a vector graphic object using a graphic definition object in accordance with some embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction

A method, apparatus and computer program product are provided in accordance with example embodiments of the present invention to generate dynamic vector graphics. As noted above, the inventors have identified that present systems that utilize vector graphics are often inadequate for displaying complex interfaces due to the performance impact from using multiple canvases to display vector graphics simultaneously. Recognizing these limitations, the inventors have developed methods and systems for merging multiple graphic elements into a single vector image that uses only a single canvas. Embodiments of the invention provide a framework for the definition and generation of such images that enables efficient, flexible display of interfaces in a vector graphic format, thus obtaining the benefit of increased scalability and visual fidelity, while avoiding much of the system performance impact associated with the implementation of such graphics.

For the purposes of this disclosure, the term "vector graphic" or "vector image" refers to any image or graphic stored as a data structure comprising a definition of portions of the graphic as a set of lines and/or curves. For example, this term is understood to encompass images stored in formats that comply with the Scalable Vector Graphic (SVG) standard. This definition is offered in contrast to "raster graphic" or "raster image" which are understood to store the image or graphic as a series of points or bitmaps.

For the purposes of this disclosure, the term "graphic element" refers to any data structure or set of instructions that define a visual element to be included in a vector graphic. The term should be understood to include discrete image elements (e.g., a text or numeric character), combined elements (e.g., a clock interface control or a floor map), and formatting elements (e.g., column width, row height, font size, window title) of the vector graphic. Embodiments of the invention operate to merge definitions of individual graphic elements into a single data object that, when rendered by a rendering element, serves to generate a single vector image having a plurality of such graphic elements.

Exemplary Client and Server Apparatuses

FIG. 1 illustrates a block diagram of an apparatus 100 in accordance with some example embodiments. The apparatus 100 may be any computing device capable of generating vector graphics as described herein. For example, the apparatus 100 may be implemented as a computing device executing software for determining a graphic definition object from a set of graphic element definitions, rendering the graphic definition object to generate a vector graphic, and displaying the vector graphic.

The apparatus 100 may be implemented as a standalone or rack-mounted server, a desktop computer, a laptop computer, a personal digital assistant, a tablet computer, a netbook computer, a mobile device, or the like. Accordingly, it will be appreciated that the apparatus 100 may comprise devices, hardware, and the like configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG. 1, an apparatus 100 may include a processor 102, a memory 104, input/output circuitry 106, communications circuitry 108, graphic definition circuitry 110, vector graphic rendering circuitry 112, and graphic display circuitry 114. Although these components 102-114 are described with respect to functional limitations, it should be understood that the particular implementations necessarily include the use of particular hardware. It should also be understood that certain of these components 102-114 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, "circuitry" includes programmed processing circuitry, storage media, network interfaces, input/output devices, and/or the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like, such that each of the circuitries may be formed by other circuitry components of the apparatus 100.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may include various processing devices and may, for example, include one or more processing devices configured to perform independently from one another. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, and the instructions may specifically configure the processor to perform the algorithms and/or operations described herein when the instructions are executed.

In some embodiments, the apparatus 100 may include input/output circuitry 106 that may, in turn, be in communication with the processor 102 to provide output to the user and/or to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like). The input/output circuitry 106 may provide a mechanism for display of a vector graphic, receiving input via an interface associated with that vector graphic, receiving input defining graphic elements for display within the vector graphic, and the like.

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The graphic definition circuitry 110 includes hardware configured to generate a graphic definition object defining instructions for a renderer, such as the vector graphic rendering circuitry 112, to generate a vector graphic. The graphic definition circuitry 110 may include hardware and software configured to receive input defining one or more graphic elements to be included in the final vector graphic, and to identify definition code associated with those graphic elements. The definition code associated with the defined graphic elements may be stored as a graphic definition object which is provided to a renderer. In this regard, the graphic definition circuitry 110 may include a processing element, such as the processor 102, for determining definition code associated with graphic elements to be included in the graphic definition object, and storing that graphic definition object via a memory, such as the memory 104. The generated graphic definition object may further be transmitted to or stored in a location accessible to the vector graphic rendering circuitry 112. In some embodiments the graphic definition circuitry 110 may also be operable to provide a test canvas or other mechanism to display a rendered vector graphic version of a graphic definition object as input is provided to define the graphic elements of the graphic definition object.

The vector graphic rendering circuitry 112 includes hardware configured to receive a graphic definition object and to generate a vector graphic from the graphic definition object. The vector graphic rendering circuitry 112 parses the graphic definition object to identify particular functions, plugins, and other code portions related to each graphic element of the graphic definition object and executes those functions, plugins, and code portions to generate a vector graphic. This functionality is provided by a processing element, such as the processor 102. The vector graphic rendering circuitry 112 may receive the graphic definition object from the graphic definition circuitry 110 as described above. The generated vector graphic may be stored in a memory by the vector graphic rendering circuitry 112, such as the memory 104, though in some embodiments the vector graphic rendering circuitry 112 may provide the vector graphic directly to an output device (e.g., a display provided by the input/output circuitry 106), or transmit the vector graphic to another device or another component of the apparatus 100 (e.g., the graphic display circuitry 114).

The graphic display circuitry 114 includes hardware configured to output the vector graphic generated by the vector graphic rendering circuitry 112. The graphic display circuitry 114 may include a processing element, such as the processor 102, configured to use the vector graphic as a component of an interface or otherwise format the vector graphic for display. The graphic display circuitry 114 therefore implements a canvas or other environment suitable for display of the vector graphic. The graphic display circuitry 114 may also include a display, or a display such as provided by the input/output circuitry 106 may be used in conjunction with the graphic display circuitry 114 to output the vector graphic.

As will be appreciated, any computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Example of Data Flow for Generating a Vector Graphic

FIG. 2 illustrates a data flow 200 describing example system interactions among components of a vector graphic generator 202 in accordance with embodiments of the present invention. The vector graphic generator 202 may be implemented by, for example, components of the apparatus 100 as described above. The data flow 200 illustrates the manner in which input defining graphic elements to be included in a vector graphic is received, those inputs are processed to generate a graphic definition object, and the graphic definition object is rendered to generate a vector graphic.

An input/output element 204 provides input indicating a set of graphic element definitions to a graphic definition element 206. The graphic definition element 206 may provide a canvas 208 for display of a generated vector graphic. This canvas 208 may be employed to visualize a vector graphic as it is being defined within an authoring interface 210. The graphic definition element 206 may provide the authoring interface 210 allowing interaction with the input/output element 204 to receive definitions of graphic elements to be included in the vector graphic. For example, the graphic definition element 206 may implement an Integrated Development Environment (IDE) that allows a user to define a template for a graphic definition object and to select graphic elements for inclusion in that graphic definition object. The user may select particular graphic elements by selecting the elements from a list, dragging and dropping elements, entering text strings defining attributes of the graphic elements, or the like.

In operation, the graphic definition element 206 may access a set of graphic element definitions 212 based on the input received via the authoring interface 210. The graphic element definitions 212 may include a repository of definitions, structures, or the like for particular graphic elements and their associated attributes. Each graphic element available for selection via the authoring interface 210 may be associated with one or more of these definitions.

The graphic element definitions 212 may define, for example, valid attributes for particular graphic elements and other characteristics of those elements. For example, a "time" graphic object may include definitions indicating whether the time to be displayed is a 12 hour clock or a 24 hour clock, whether the time should include a daylight savings time conversion, a time zone, or other attributes related to the insertion of a time graphic element into a graphic object. In some embodiments, selection of a particular graphic element via the authoring interface 210 may cause a query to be executed against the set of graphic element definitions 212 to obtain the appropriate data values associated with the selected graphic element. The results of this query are added to a graphic definition object 214 which is a definition of the one or more graphic elements that are to be rendered to generate a vector graphic. The graphic element definitions 212 may also define a set of queries for execution against a content database 213 to identify content associated with the graphic element which is to be included in the graphic definition object 214 by the graphic definition element 206.

The content database 213 may provide content associated with particular graphic controls. The content database 213 may, in some embodiments, represent an external system that is accessible to the graphic definition element 206 for performance of one or more queries. For example, the content database 213 may be a hospital admit/discharge/transfer system, an electronic health records system, a picture archiving and communications system or the like. The graphic element definitions 212 may include particular instructions for querying the content database 213 to obtain content for inclusion in one or more of the graphic elements defined within the graphic definition object 214. For example, if the graphic object displays a map of patient rooms needing to be cleaned, the corresponding rendering instructions for that graphic element may instruct the graphic definition element 206 to query the content database 213 for a list of dirty rooms.

The graphic definition object 214 may be implemented in a variety of manners, including but not limited to a Java class. The graphic definition object 214 may be implemented as a base class which is extended with the additional graphic elements selected via the authoring interface 210. An example process for generating a graphic definition object according to embodiments of the present invention is described further below with respect to FIG. 5.

The graphic definition object 214 is provided to a rendering element 216. The rendering element 216 operates to process and consume the graphic definition object 214 to generate a vector graphic 222. To this end, the rendering object 216 accesses a database of rendering instructions 218. The rendering instructions 218 include particular executable instructions for rendering the different types of graphic elements defined within the graphic definition object 214. The rendering element 216 parses the graphic definition object 214 to identify the graphic elements included therein, and executes appropriate code from the rendering instructions 218 associated with the identified graphic elements. It should be appreciated that, while the rendering instructions 218 are described in this context with respect to a database of different code files, the rendering instructions 218 could be implemented in any of various manners, including but not limited to individual executables, shared libraries, or the like. An example of a process for generating a vector graphic from a graphic definition object 214 is described further below with respect to FIG. 6.

As part of the processing for rendering a graphic object, the rendering element 216 may execute program code that receives the graphic element definition and any associated attributes, and maps that definition into a vector graphic, such as by determining locations within the vector graphic, implementing any defined rows and columns, spacing graphic elements based on those defined rows and columns, and any other task related to translating a graphic element definition into a vector graphic format. It should be appreciated that each graphic element may be implemented in a different manner, owing to the specific manner in which that graphic element is to be displayed.

The rendering element 216 may use the rendering instructions 218 and the content database 220 to generate the vector graphic 222. The vector graphic 222 may, for example, be a file or document stored in a markup language according to one or more vector graphic standards, such as SVG. The rendering element 216 may maintain or update the vector graphic 222 over time and in response to certain criteria, such as time elapsing or a detection or notification of a change to the corresponding graphic definition object.

The vector graphic 222 may be stored in a memory or transmitted to the graphic definition element 206 or another internal component of the vector graphic generator 202 or an external system or component. The graphic definition element 206 may display the generated vector graphic 222 to enable a user of the graphic definition element 206 and/or input/output element 204 to view the impact of received definitions for graphic elements in the canvas 208. This display may be updated in real time as additions, deletions, edits, and changes to the graphic elements are implemented.

Exemplary Interfaces for Generating Vector Graphics

FIG. 3 illustrates an example of a template definition interface 300 such as may be provided by embodiments of the present invention in order to assist with selection of graphic elements for inclusion in a vector graphic. The template definition interface 300 includes a plurality of fields that are processed by an authoring interface to select particular graphic element definitions for inclusion in a graphic definition object. In this regard, the template definition interface 300 may include a plurality of template options 302. The template options 302 may include interface controls or fields that define high level configuration options that affect the entire graphic definition object and which may be embedded within a generated vector graphic. For example, the template options 302 may include a field allowing specification of a refresh time interval for the resultant vector graphic, whether the graphic should auto-paginate, whether the vector graphic should have a header, or whether the vector graphic has the capability to scroll.

The template definition interface 300 further includes a set of plugin definition fields 304. The plugin definition fields 304 indicate the particular plugins that have been selected for inclusion in the graphic definition object. In this context, the term "plugin" is understood to refer to a set of objects (e.g., room, patient, etc . . . ) that is the result of a query grouped in an organized fashion (e.g., by unit). Population of the plugin definition fields 304 may be performed by selection of particular graphic elements from a menu provided by an integrated development environment, or in some embodiments manually entered text may be used to select the particular plugins for inclusion. It should be appreciated that the graphic definition object may also include various attributes, layout options, maps, and the like which are applied to the underlying plugin to determine the graphic element and components thereof. The plugin definition fields 304 may further include a set of attributes or properties associated with the particular plugin. For example, the plugin definition fields 304 may identify a database query or file to be accessed to obtain data for populating portions of the plugin.

The template definition interface 300 also includes a set of layout definition fields 306. The layout definition fields 306 include data used to define a template parameter that defines a particular region of an output vector graphic (e.g., a particular column). The defined layout may provide a region of an output vector graphic that can receive one or more plugins or maps for display. For example, the layout definition fields 306 may define the location within the larger vector graphic in which the contents associated with a selected plugin are defined, whether border lines are drawn between plugins, titles and/or headers for each plugin, or the like.

The template definition interface 300 also includes a set of map definition fields 308. The map definition fields 308 identify the underlying content associated with a particular plugin. For example, the map definition fields may include a particular image file to be displayed, a dynamic interface control or design pattern (e.g., a "census bar" as described below with respect to FIG. 4), an "app" or "widget" (e.g., a clock display). The map definition fields 308 may indicate an image or the like that provides the structure upon which a plugin defined within the plugin definition fields 304 is mapped.

FIG. 4 is an illustration of an authoring interface 400 for visualizing a vector graphic in accordance with embodiments of the present invention. The authoring interface 400 may provide a mechanism for selecting graphic elements for inclusion in a vector graphic. The authoring interface includes a canvas area 402 for display of a vector graphic that corresponds to a graphic definition object generated through input to the authoring interface 400. In the present example, the canvas area 402 depicts three separate graphic elements which are represented as columns within the canvas. The first graphic element 404 depicts a series of graphic elements 414 associated with hospital rooms in need of cleaning. Each of the series of graphic elements 414 may be derived from a graphic definition object. In processing of the graphic definition object, a renderer may determine which graphic elements should be defined based on the plugin associated with the first graphic element, and generate a vector graphic having those graphic elements. The rendering process may, for example, determine a width of a column, a number of graphic elements to display within that column, the particular graphic elements associated with data retrieved from a content database, and the like. The first graphic element may also include a whitespace element 416. The whitespace element 416 may similarly be identified and included in the vector graphic by the renderer processing the graphic definition object.

The canvas area 402 also depicts a second graphic element 406. The second graphic element 406 includes two sub-elements 410 and 412. The first sub-element 410 depicts a map of a physical area of a hospital. The map may reflect the current status of the rooms in that area of the hospital. To generate the map, the renderer may identify a set of executable code associated with the plugin type indicated in the graphic definition object. The executable code may identify an image associated with the physical map, determine regions of that image associated with particular rooms, perform queries against a content database to determine the status of those particular rooms, and populate the determined regions of the image with the status of those rooms. The populated image may then be used to generate a graphic element of a vector graphic, which is output as the first sub-element 410.

The second sub-element 412 depicts an interface control for displaying a capacity indicator for a particular area (e.g., a ward or wing) of a hospital. The interface control for the capacity indicator may be generated in a similar manner as the first graphic element 404 and the first sub-element 410. For example, the capacity indicator may be defined as a graphic element within a graphic definition object. The renderer element may receive the graphic definition object and identify a set of executable code associated with the capacity indicator plugin. This executable code may, upon execution, perform a query to a content datastore to determine the current number of occupied beds, the total number of available beds, and to calculate the available capacity. The executable code may subsequently generate the portion of the vector graphic that corresponds to the capacity calculator interface control.

The third graphic element 408 depicts an interface control that relates to occupied patient beds and whether those patients are in-patients or out-patients. As with the first graphic element 404 and the second graphic element 406, the graphic definition object for the third graphic element 408 defines a plugin for the patient beds, and the renderer selects executable code based on that plugin. The executable code subsequently queries a content datastore to obtain the relevant data (e.g., in-patient status, out-patient status, available beds), and to generate the interface control as a portion of a vector graphic.

Exemplary Processes for Generating a Vector Graphic

FIG. 5 is a flow diagram depicting an exemplary process 500 as performed by a computing device, such as the apparatus 100, for generating a graphic definition object in accordance with embodiments of the present invention. The process 500 illustrates a mechanism for receiving user input to define graphic elements for inclusion in a graphic definition object. The graphic definition object may subsequently be provided to a renderer to generate a vector graphic having graphic elements as defined in the graphic definition object. In this regard, the process 500 illustrates an example of an algorithm that is implemented via hardware or software executing on hardware components of an apparatus to implement these tasks and other tasks related to generation of a graphic definition object. This algorithm may serve as means for implementing these tasks and other functions as described above and herein.

At action 502, input is received that defines a graphic element. The input may be received via an authoring interface, such as described above with respect to FIGS. 1, 2, and 4. As noted above, the input may include a definition of one or more plugins, layout options, maps, data sources, or the like.

At action 504, a graphic definition datastore is queried to identify a graphic definition for the graphic element, which may include one or more appropriate classes, data structures, or the like that define the graphic element in a manner such that a renderer can render the graphic element as a portion of a vector graphic.

At action 506, any content queries defined within the graphic definition of the graphic element are executed against a content datastore to obtain relevant content associated with that graphic element.

At action 508, the graphic definition for the graphic element is added to a graphic definition object. This graphic definition object may include graphic definitions for each graphic element and relevant content for the graphic element as retrieved from the content datastore to be included in the final vector graphic generated by a renderer. As a result, the graphic definition object may include definitions for a plurality of separate graphic elements, sub-elements of those graphic elements, and the like.

At action 510, the graphic definition object is provided to a renderer. The renderer is configured to receive the graphic definition object and to generate a vector graphic corresponding to the graphic elements defined within the graphic definition object. An example of a process for rendering a vector graphic using a graphic definition object is provided further below with respect to FIG. 6.

At action 512, a vector graphic is received from the renderer. As noted above, the rendered vector graphic may be presented according to the SVG standard or any other format for defining a scalable graphic in a vector format. It should be appreciated that, while the process 500 is described as receiving the vector graphic and subsequently displaying the vector graphic, in some embodiments the display process and the definition process are performed as separate and distinct processes. For example, an authoring interface may not implement a mechanism for viewing the vector graphic derived from the graphic definition object generated by the authoring interface, or a display component may receive and display the vector graphic without any visibility into the process by which that vector graphic was rendered.

At action 514, the vector graphic is displayed via a canvas. In this manner, the vector graphic having a plurality of separately defined graphic elements may be consolidated into display within a single canvas, eliminating the need to use multiple canvases to display multiple graphic elements.

FIG. 6 is a flow diagram depicting an example of a process 600 for rendering a vector graphic from a graphic definition object in accordance with embodiments of the present invention. The process 600 illustrates a mechanism by which a renderer may receive a graphic definition object (e.g., a Java object or class) and generate a vector graphic. In this regard, the process 600 illustrates an example of an algorithm that is implemented via hardware or software executing on hardware components of an apparatus to implement these tasks and other tasks related to generation of a vector graphic from a graphic definition object. This algorithm may serve as means for implementing these tasks and other functions as described above and herein.

At action 602, a graphic definition object is received. As noted above, the graphic definition object may be a Java object or class that includes individual objects for a plurality of graphic elements. To process the graphic definition object, the process 600 may identify each graphic element defined within the graphic definition object in turn. At action 604, a next graphic element is selected. To process the graphic definition object, the process 600 may iterate through each graphic element included within the graphic definition object, and process each in turn.

At action 606, a determination is made as to whether the selected graphic element has any sub-elements. If the graphic element has a sub-element, then the process proceeds to action 607. If the graphic element does not have any sub-elements, then the process proceeds to action 608.

At action 607, if the graphic element has any sub-elements, the first sub-element is selected and the process 600 recursively proceeds with respect to the sub-element. In this manner, the process 600 may process each sub-element to add the relevant features of the sub-element to the completed output vector graphic.

At action 608, the selected graphic element is processed to add the relevant features of the graphic element to a vector graphic. Processing of the selected graphic element may include identifying a set of executable instructions designed to process the particular type of graphic element. These instructions may be selected from a plurality of sets of instructions based on a type of graphic element defined by the selected graphic element. For example, each type of graphic element may be associated with a particular class which defines the executable code for converting the particular graphic element definition into a vector graphic format. The executable code may include instructions that identify a particular image associated with the graphic element, position the image within a vector graphic, format the graphic element, populate the graphic element with content retrieved from a content datastore, and update the vector graphic with instructions that cause a canvas to display the graphic element.

This executable code may be implemented as a series of files, such as JavaServer Page files (JSPX). In some embodiments, such files are organized into 3 groupings or sections. A first set of code is operable to sets up and creates an empty vector graphic document. A next set of code is operable to generate a set of headers to provide organization within the vector graphic document. A third set of code is operable to populate the vector graphic document and attendant headers with content. This third set of code determines what kind of object is stored in portions of the vector graphic. The third set of code functions to output, for example, room graphics, patient graphics, sub graphic elements, lines, charts, or the like.

At action 610, a determination is made as to whether all of the graphic elements have been rendered. If so, the process 600 finalizes the vector graphic and stores and/or transmits the vector graphic at action 612. If all of the graphic elements have not been processed, the process 600 returns to action 604 to select the next graphic element and to continue the process until all graphic elements have been processed.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 or 204 of an apparatus employing an embodiment of the present invention and executed by a processor 102 or 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for dynamically generating a single vector graphic comprising a dynamic number of graphic elements configured via an authoring interface, the method comprising:
    receiving a user input via the authoring interface, the user input defining a plurality of graphic elements, wherein the number of the plurality of graphic elements is dynamic;
    receiving additional user input via the authoring interface, the additional user input defining a layout of the plurality of graphic elements within the single vector graphic;
    determining a plurality of graphic element definitions, each graphic element definition corresponding to at least one of the plurality of graphic elements and being defined in an object-oriented programming language;
    generating a graphic definition object comprising each of the graphic element definitions;
    providing the graphic definition object to a vector graphic renderer to permit rendering of the single vector graphic by recursively processing the graphic element definitions and sub-objects thereof; and
    receiving, from the vector graphic renderer, the single vector graphic comprising each of the plurality of graphic elements according to the defined layout, wherein the single vector graphic is displayed via a single vector graphic canvas.

2. The method of claim 1, further comprising causing display of the single vector graphic via a display device.

3. The method of claim 1, further comprising rendering the graphic definition by the single vector graphic object by at least:
    determining at least one set of executable code associated with each of the plurality of graphic elements; and
    executing the at least one set of executable code to determine at least a portion of the single vector graphic.

4. The method of claim 3, wherein the at least one set of executable code is determined based at least in part on a type of graphic element indicated by at least one of the graphic element definitions.

5. The method of claim 1, wherein the graphic definition object is a Java object.

6. The method of claim 1, wherein the single vector graphic is formatted according to the Scalable Vector Graphic standard.

7. The method of claim 1, wherein the graphic element comprises at least one sub-element.

8. The method of claim 1, wherein at least one of the graphic element definitions defines at least one query to be executed against a content datastore, and wherein the method further comprises:
    executing the at least one query against the content datastore; and
    including a result of the at least one query in the graphic definition object.

9. The method of claim 1, wherein the rendering by the vector graphic renderer comprises:
    creating an empty vector graphic document;
    generating a set of headers to populate the vector graphic document; and
    outputting graphic elements within the vector graphic document.

10. An apparatus for dynamically generating a single vector graphic comprising a dynamic number of graphic elements configured via an authoring interface, the apparatus comprising a processor and a memory, the memory storing instructions that configure the processor to at least:
    receive a user input via the authoring interface, the user input defining a plurality of graphic elements, wherein the number of the plurality of graphic elements is dynamic;
    receiving additional user input via the authoring interface, the additional user input defining a layout of the plurality of graphic elements within the single vector graphic;
    determine a plurality of graphic element definitions, each graphic element definition corresponding to at least one of the plurality of graphic elements and being defined in an object-oriented programming language;
    generate a graphic definition object comprising each of the graphic element definitions;
    provide the graphic definition object to a vector graphic renderer to permit rendering of the single vector graphic by recursively processing the graphic element definitions and sub-objects thereof; and
    receive, from the vector graphic renderer, the single vector graphic comprising each of the plurality of graphic elements according to the defined layout, wherein the single vector graphic is displayed via a single vector graphic canvas.

11. The apparatus of claim 10, further configured to cause display of the single vector graphic via a display device.

12. The apparatus of claim 10, further configured to render the graphic definition by the vector graphic object by at least:
    determining at least one set of executable code associated with each of the plurality of graphic elements; and
    executing the at least one set of executable code to determine at least a portion of single the vector graphic.

13. The apparatus of claim 12, wherein the at least one set of executable code is determined based at least in part on a type of graphic element indicated by at least one of the graphic element definitions.

14. The apparatus of claim 10, wherein the graphic definition object is a Java object.

15. The apparatus of claim 10, wherein the single vector graphic is formatted according to the Scalable Vector Graphic standard.

16. The apparatus of claim 10, wherein the graphic element comprises at least one sub-element.

17. The apparatus of claim 10, wherein at least one of the graphic element definitions defines at least one query to be executed against a content datastore, and wherein the method further comprises:
    executing the at least one query against the content datastore; and
    including a result of the at least one query in the graphic definition object.

18. The apparatus of claim 10, wherein the memory further stores instructions that configure the processor to at least:
    create an empty vector graphic document;
    generate a set of headers to populate the vector graphic document; and
    output graphic elements within the vector graphic document.

19. A non-transitory computer readable storage medium comprising instructions for dynamically generating a single vector graphic comprising a dynamic number of graphic elements configured via an authoring interface that, wherein the instructions, when executed by a processor, configure the processor to at least:
- receive a user input via the authoring interface, the user input defining a plurality of graphic elements, wherein the number of the plurality of graphic elements is dynamic;
- determine a plurality of graphic element definitions, each graphic element definition corresponding to at least one of the plurality of graphic elements;
- generate a graphic definition object comprising each of the graphic element definitions and being defined in an object-oriented programming language;
- provide the graphic definition object to a vector graphic renderer to permit rendering of the single vector graphic by recursively processing the graphic element definitions and sub-objects thereof; and
- receive, from the vector graphic renderer, the single vector graphic comprising each of the plurality of graphic elements according to the defined layout, wherein the single vector graphic is displayed via a single vector graphic canvas.

20. The computer readable storage medium of claim 19, further comprising instructions configured to cause display of the single vector graphic via a display device.

* * * * *

UNITED STATES PATENT AND TRADEMARK OFFICE
CERTIFICATE OF CORRECTION

PATENT NO. : 10,002,400 B2
APPLICATION NO. : 15/084824
DATED : June 19, 2018
INVENTOR(S) : Self et al.

Page 1 of 1

It is certified that error appears in the above-identified patent and that said Letters Patent is hereby corrected as shown below:

In the Claims

Column 17,
Line 4, Claim 19, "interface that," should read --interface,--.

Signed and Sealed this
Sixth Day of November, 2018

Andrei Iancu
*Director of the United States Patent and Trademark Office*